US006220834B1

(12) United States Patent
Hurr et al.

(10) Patent No.: US 6,220,834 B1
(45) Date of Patent: Apr. 24, 2001

(54) SUPPORT PIPE FOR CONCRETE PUMP WITH PIVOTING VALVE

(75) Inventors: Hellmut Hurr, Reutlingen; Klaus Bührer; Hartmut Benckert, both of Filderstadt, all of (DE)

(73) Assignee: Putzmeister Aktiengesellschaft (DE)

( * ) Notice: Subject to any disclaimer, the term of this patent is extended or adjusted under 35 U.S.C. 154(b) by 0 days.

(21) Appl. No.: 09/446,527

(22) PCT Filed: Nov. 25, 1998

(86) PCT No.: PCT/EP98/07588
§ 371 Date: Dec. 23, 1999
§ 102(e) Date: Dec. 23, 1999

(87) PCT Pub. No.: WO99/40319
PCT Pub. Date: Aug. 12, 1999

(30) Foreign Application Priority Data

Feb. 9, 1998 (DE) .............................. 198 04 863

(51) Int. Cl.[7] .................... F04B 7/00; F16L 9/18
(52) U.S. Cl. ...................... 417/516; 417/900; 138/114
(58) Field of Search .................. 417/516, 900; 138/114, 137; 137/625.45

(56) References Cited

U.S. PATENT DOCUMENTS

| 2,700,988 | * | 2/1955 | Smisko | 138/25 |
| 3,509,917 | * | 5/1970 | Gartner | 138/32 |
| 3,832,097 | * | 8/1974 | Schlect | 417/516 |
| 4,178,142 | * | 12/1979 | Schwing | 417/516 |
| 4,410,013 | * | 10/1983 | Sasaki et al. | 138/149 |
| 4,431,386 | * | 2/1984 | Fehler et al. | 417/517 |
| 4,502,851 | * | 3/1985 | Calvin et al. | 417/516 |
| 5,114,319 | * | 5/1992 | Faber | 417/342 |
| 5,746,247 | * | 5/1998 | Schlecht et al. | 137/625.45 |

FOREIGN PATENT DOCUMENTS

0171796 * 2/1986 (EP) .
2039603 * 8/1980 (GB) .

* cited by examiner

Primary Examiner—Charles G. Freay
Assistant Examiner—Timothy P Solak
(74) Attorney, Agent, or Firm—Pendorf & Cutliff

(57) ABSTRACT

The invention relates to a sliding device for two-cylinder pumps for liquids, especially designed for concrete pumps. The sliding device (20) has a pivot pipe (16) which is bent and has substantially a C-shape. The pivot pipe is fixedly connected, at its upper end, to an extension pipe (42) protruding over a back wall (24) of a material feeding bin and connected, at its end opposite the pivot pipe, to a discharge conduit through a pipe rotating connection. The pivot pipe is placed in such a way that it is able to pivot about the axis of the extension pipe so that its other end is connected alternatively to the openings of the discharge cylinder (10). In order to ensure reliable operation in spite of frictional wear in the extension pipe (42), the invention provides for a support pipe (84) which coaxially overlaps the extension pipe (42), is fixedly connected to the upper end of the pivot pipe and extends over least on one part of the extension pipe (42). The support pipe (84) is stayed upon at least one rotating support (98) connected to the material feeding bin and spaced apart from the back wall (24) of the material feeding bin (14) and releasably connected to the extension pipe (42).

15 Claims, 2 Drawing Sheets

SUPPORT PIPE FOR CONCRETE PUMP WITH PIVOTING VALVE

BACKGROUND OF THE INVENTION

1. Field of the Invention

The invention concerns a sliding device for a pump having two conveyance cylinders operating in counterstroke for conveyance of viscous materials supplied to the pump from a material feeding bin, and including a C-shape curved pivot pipe, an extension pipe, and a discharge conduit. The pivot pipe extends into the material feeding bin and at its upper end is connected to the extension pipe. The extension pipe projects over the back wall of the material feeding bin essentially parallel to the conveyance cylinders and, on its end opposite the pivot pipe, is connected to the discharge conduit via a pipe rotating connection. The pivot pipe is connected for pivoting so that its lower end, preferably provided with an anti-friction ring, is caused via a reversing mechanism to connect alternatively to the openings of the conveyance cylinders which are connected to the back wall of the material supply bin.

2. Description of the Related Art

Sliding devices of this general type (DE-C-21 62 406) are particularly suitable for use as mobile cement pumps because of their compact construction, wherein the extension pipe extends over the back wall of the material supply bin and forms a connection with the conveyor mast which rests on the front portion of the chassis, and wherein the material supply bin can be easily charged or fed from the back side of the vehicle chassis. Those parts of the sliding device which are subjected to high friction wear are easily accessible from the upper side of the material supply bin and thus can be changed out in a simple matter. The pipe extending beyond the back wall of the material supply bin serves in the known sliding devices on the one hand as transport pipe for the thick materials which are often abrasive and thus is subjected to a significant amount of frictional wear. On the other hand, the extension pipe has at the same time a support bearing function for the pivot pipe. In the case of increasing wear, that is, with decreasing wall thickness in the extension pipe, the integrity of the extension pipe decreases, so that a gradually increasing risk of rupturing occurs. The rupturing danger occurs above all when heavy, highly viscous cement is conveyed, and the conveyance forces acting on the extension pipe are corresponding large. A pipe rupture in this area is a problem insofar as it occurs outside of the material supply bin and thus requires an immediate cessation of the pumping operation.

SUMMARY OF THE INVENTION

Beginning with this state of the art, the invention is concerned with the task of improving a sliding device of the known type in such a manner that wear of the extension pipe does cause problems with the reliability of industrial operation.

The inventive solution is based on the idea, that the extension pipe, which is subjected to friction, is not subjected to any bearing function. In order to accomplish this, it is proposed in accordance with the invention to provide a support pipe which coaxially surrounds the extension pipe, is rigidly connected with the upper end of the pivot pipe, extends over at least a part of the extension pipe, which is supported on a pivot connection provided spaced apart from the back wall of the material supply bin, and which is releasably connected with the extension pipe.

In a preferred embodiment of the invention, it is envisioned that the extension pipe and the reversing lever of the reversing mechanism are releasably connected with the pivot pipe via a flange and that the support pipe is rigidly connected with the flange, preferably is welded thereto. In principle, it is possible that the extension pipe and the support pipe are releasably connected with the pivot pipe and the reversing lever of the reversing mechanism via a common clamping flange. In order to be able to mount and dismount the extension pipe in a simple manner, it is important, that the outer surface of the extension pipe and the inner surface of the support pipe form or define an annular clearance. The connection between the support pipe and the extension pipe can, with maintenance of the annular clearance, be stabilized in the manner, that the support pipe on its free end is wedged or forms a V shaped connection with the extension pipe. In particular, the support pipe can be releasably anchored at its free end to the extension pipe via a set screw. When, as a result of frictional wear, a leak occurs in the extension pipe, then material is extruded into the annular clearance during the pumping process. When at least a preferably downward directed radial wall opening is provided in the support pipe, at least in the area of its end nearest the pivot pipe, then a leak occurring in the extension pipe can be relatively easily detected from the outside. On the basis of the stabilizing effect of the support pipe, a pipe rupture is reliably avoided.

For increasing the frictional resistance, the extension pipe can be constructed in two parts, wherein the inner pipe is constructed to be friction resistant, preferably hardened steel, and the outer pipe is constructed of a softer, not hardened, steel. Since the curved pivot pipe on its inner side is not hardened, it is of advantage, when the extension pipe at least on the connecting side of the pivot pipe has a larger inner diameter than the pivot pipe, making possible a greater removal of material from the pivot pipe.

In order to improve the up-take of the bending forces occurring during the direction changing process, it is of advantage, when the reversing lever on its conveyance conducting side exhibits a corbeled or cantilevered support arm, upon which the support pipe is supportable. The support arm can thereby, with it's end supporting the support jacket, lie loosely against the support pipe or be releasably connected therewith.

The rotating connections supporting the support pipe are advantageously formed as slide mounts with exchangeable slide mount segments. Depending upon the diameter of the support pipe, or the extension pipe to be supported, more or less thick walled support shell segments can be employed.

BRIEF DESCRIPTION OF THE DRAWINGS

In the following the invention will be described in greater detail on the basis of the embodiment represented in schematic manner in the drawings. There are shown in FIG. 1 a section of a two-cylinder thick material pump in partial broken open perspective representation.

DETAILED DESCRIPTION OF THE INVENTION

Figure 1:
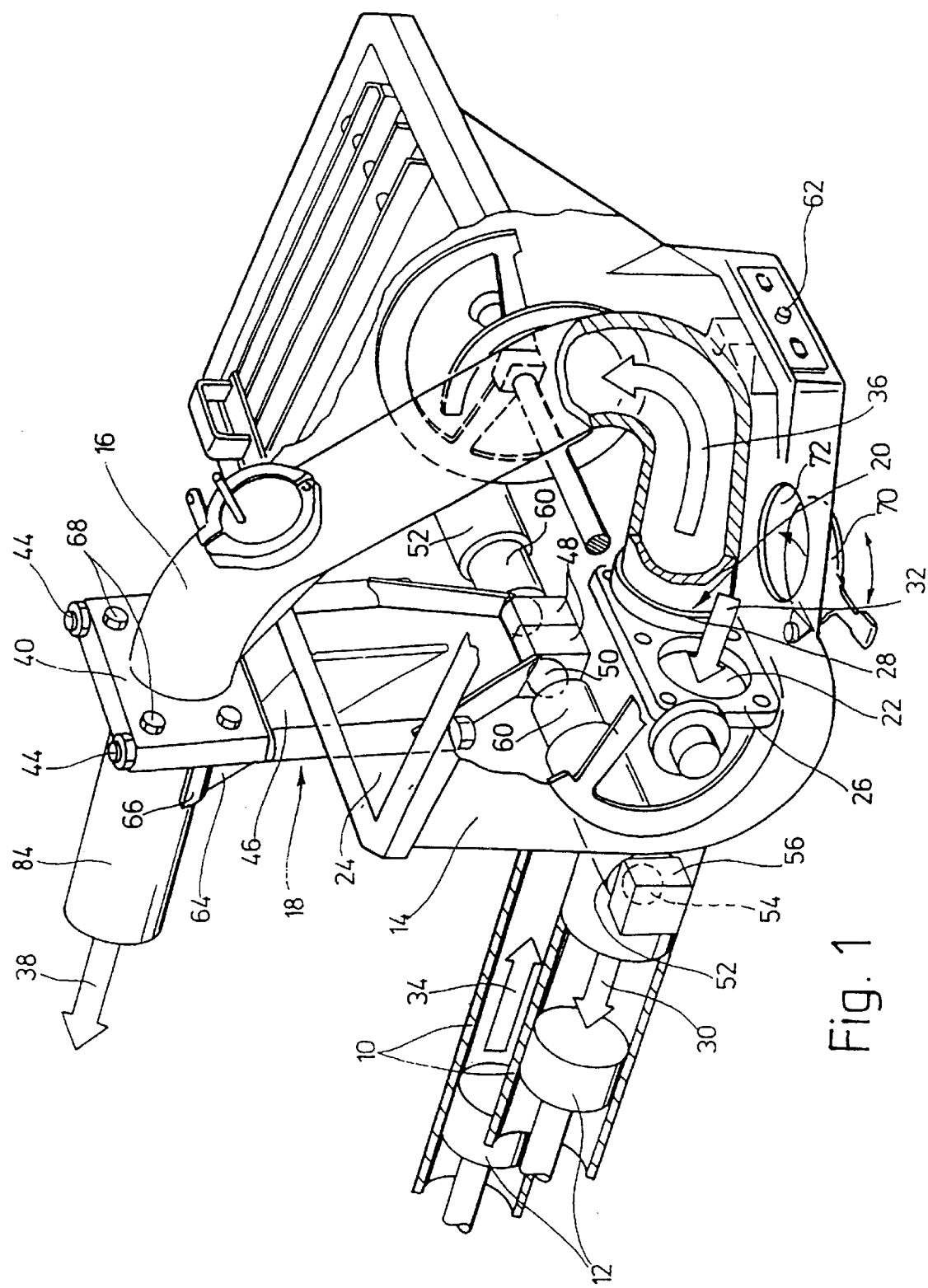

The two-cylinder thick material pump shown in the drawings is designed particularly for employment in cement truck pumps. It is comprised essentially of two conveyance cylinders 10 with conveyance pistons 12 driven hydraulically in counterstroke, a material supply bin 14 and a sliding device 20 with a C-shaped pivot pipe 16 engaging from above into the material supply bin 14, operable by a reversing mechanism 18. The conveyance cylinders 10 are connected to openings 22 on the back wall 24 of the material supply bin 14, wherein the openings 22 on their inner side of the material supply bin 14 are bordered by a glasses-shaped closure plate 26. The pivot pipe 16 lies with its lower 26, friction ring 28 carrying end against the friction plate and is pivoted to the front of one or the other of the openings 22 by the reversing mechanism 18 depending upon the movement of the conveyance pistons 12 in the conveyance cylinders 10. In this manner, in the case that the conveyance piston 12 is moving backwards in the direction of the arrow 30, material is suctioned out of the material supply bin 14 in the direction of the arrow 32 through the opening 22 into the respective conveyance cylinder 10, while via the other conveyance piston 12 material is transported in the direction of the arrows 34, 36, 38 through the pivot pipe 16 and a conveyance conduit 45 situated behind the back wall 24 of the material supply bin 14. For this purpose, the pivot pipe 20 is connected via a flange 40 with an extension pipe 42, which for its part is connected via a pipe rotating connection 43 for example to a conveyance conduit 45 leading to a cement dispersing or distributing mast.

The flange 40 is releasably connected with the reversing lever 46 of the reversing mechanism 18 via two tension screws 44, which lever at its lower end exhibits two oppositely directed or facing mounting positions 48 designed as ball sockets for the connection of the respective piston-side ball heads 50 of the two drive cylinders 52. On the cylinder side of the drive cylinder 52, the drive cylinders 52 are respectively mounted via a further ball head 54 to a conveyance cylinder fixed, ball-socket shaped mounting position 56.

In order to achieve a tight junction between the lower end of the pivot pipe 16 and the friction plate 26, a force acting perpendicular to the back wall 24 of the material supply bin 14 is exercised on the lower arm of the pivot pipe 16 via a set screw 62 operable from outside and a corresponding pressure piece, whereby during the pump process the friction ring 28 is supplementally pressed against the respective opening edge or rim of the friction plate 26 by hydrostatic forces within the pivot pipe 16.

Figure 2:
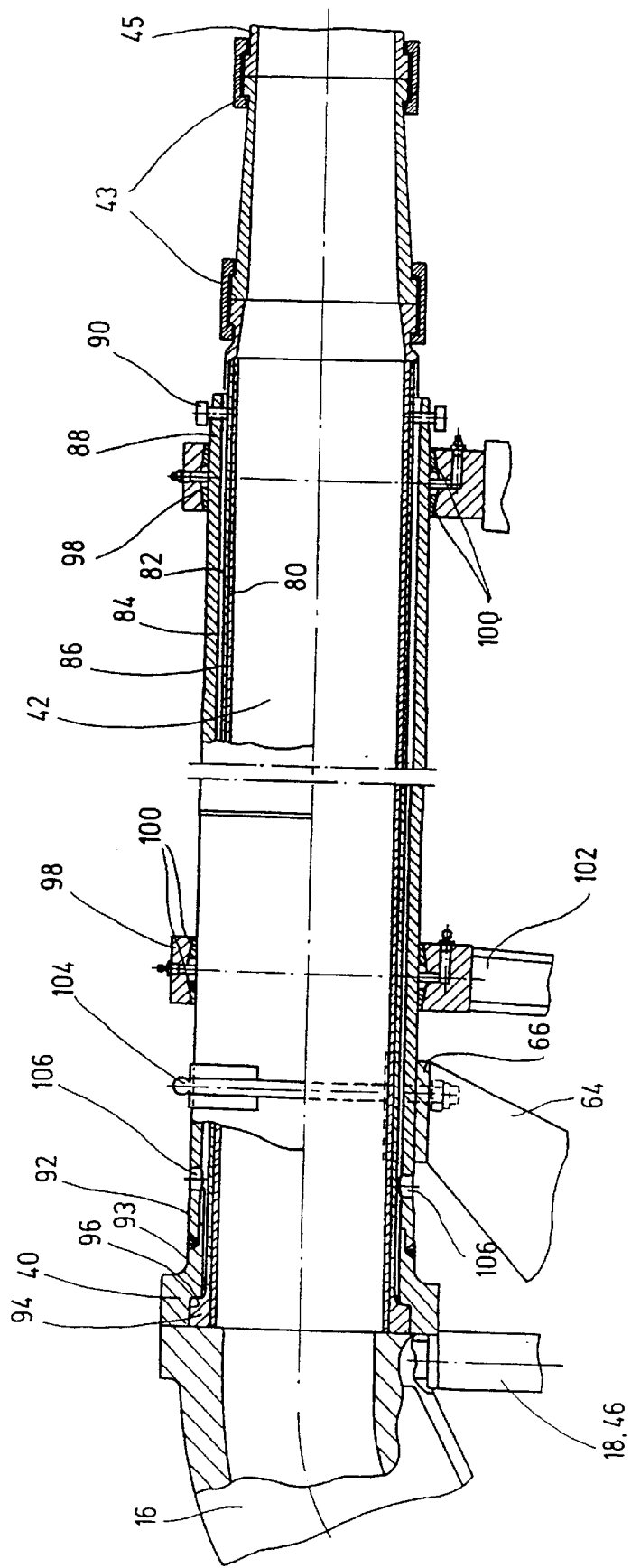
FIG. 2 a longitudinal section through the pivot pipe-extension pipe-support pipe-combination of the sliding device according to claim 1.

As can be seen from FIG. 2, the extension pipe 42 is formed in two parts. It is comprised of an inner friction resistant pipe layer 80 of hardened steel and an outer pipe layer 82 of a softer, non-hardened steel, which on their contacting areas are material locking connected or fused with each other. The extension pipe 42 is, over the greatest part of its length, covered over by a concentric support pipe 84, which is separated from the outer surface of the extension pipe 42 by a through-going or continuous annular clearance 86 and on its free end 88 is clamped to the extension pipe 42 via multiple set screws 90 distributed about the circumference of the extension pipe. The support pipe 84 is, on its pivot pipe side end 92, welded to a support 93 of the flange 40. The extension pipe has a band or collar 94 on the pivot pipe side, while the flange 40 has a corresponding ring step 96 for form-fitting receiving of the band or collar 94. For supporting of the support pipe 84 which contains the extension pipe 42, two spaced apart rotatable mounts 98 are provided, which are provided with exchangeable mounting jacket segments 100 and via the supports 102 are supported positionally fixed. As can be seen from FIG. 2, the extension pipe 42 exhibits at least on its connecting point of the pivot pipe 16 a larger inner diameter than the pivot pipe. Therewith the different frictional resis-tancies of the pivot pipe and the inner pipe layer 80 of the extension pipe are taken into consideration. The support pipe 84 exhibits in the vicinity of its pivot pipe side end 92 multiple radial wall break-throughs 106, through which any fluid material being conveyed and emitted into the annular clearance 86 has access to the outside. Therewith a leakage condition is easily recognized from the external side.

On the conveyance conduit side of the reversing lever 46 a support arm 64 is welded, which on its upwardly directed free end carries a support shell 66, in which the support pipe 84, which is connected with the pivot pipe 16, is supported. The support arm 64 takes up the bending movements occurring in the reversing lever 46 during the pump-and-pivot process and conveys these to the support pipe 84 of the pivot pipe 16. At the same time there is achieved with this arrangement that, for maintenance or service purposes or in the case of wearing out of the support pipe 84, the extension pipe 42 and the pivot pipe 16 can be easily removed by releasing the tensioning screws 44 and the flange screws 68, without having to remove the reversing lever 46 and the support arm 64 thereof. In order to prevent a lifting off of the support pipe 84 from the support shell 66 of the support arm 64, the support pipe 84 is releasably screwed onto the support shell 66 with a U-shaped bent metal bracket.

On the lower or bottom side of the material supply bin 14, there is an opening 72 which can be closed off via a pivot lid 70, via which the material supply bin 14 can be completely emptied.

In summary, the following is to be concluded: The invention relates to a sliding device for two-cylinder pumps for liquids, especially designed for concrete pumps. Said sliding device 20 has a pivot pipe 16 which is bent and has a substantially C-shape. Said pipe is fixedly connected, at its upper end, to an extension pipe 42 protruding over a back wall 24 of a material feeding bin and connected, at its end opposite the pivot pipe, to a discharge conduit through a pipe rotating connection. Said pivot pipe is placed in such a way that it is able to pivot about the axis of the extension pipe so that its other end is connected alternatively to the openings of the discharge cylinder 10. In order to ensure reliable operation in spite of wear in the extension pipe 42, the invention provides for a support pipe 84 which coaxially encompasses the extension pipe 42, is fixedly connected at the upper end of the pivot pipe and extends at least on one part of the extension 42. Said support pipe 84 is stayed upon at least one rotating support 98 integrated to the frame and placed at a distance of the back wall 24 of the material feeding bin 14 and it is removably connected to the extension pipe 42.

What is claimed is:

1. Sliding device for a pump with two conveyance cylinders operating in counter-stroke for conveyance of viscous materials, which materials are supplied to the pump from a material feeding bin having at least a front wall, a back wall, and a floor, said conveyance cylinders each having one opening in communication with said material feeding bin through said material feeding bin back wall, said sliding device including a C-shape curved pivot pipe, an extension pipe, and a discharge conduit, the pivot pipe having an upper end and a lower end, said lower end extending into the material feeding bin and said upper end being fixedly connected to the extension pipe, the extension pipe projecting over the back wall of the material feeding bin essentially parallel to the conveyance cylinders, having a first end and a second end, the first end fixedly connected to the pivot pipe, the second end connected to the discharge conduit via a pipe rotating connection, the pivot pipe connected for pivoting via a reversing mechanism in such a manner that the lower end of the pivot pipe is caused to connect alternatively outside the openings of the conveyance cylinders which are connected to the back wall of the material supply bin, and further including a support pipe which coaxially encompasses the extension pipe, is fixedly connected at the upper end of the pivot pipe, and extends along at least one part of the extension pipe, the support pipe being stayed upon at least one rotating support spaced apart from the back wall of the material feeding bin and being releasably connected to the extension pipe, wherein the extension pipe is releasably connected via a flange with the pivot pipe and with a reversing lever of the reversing mechanism, and wherein the support pipe is rigidly connected with the flange.

2. Sliding device according to one of claim 1, wherein the outer surface of the extension pipe and the inner surface of the support pipe define an annular clearance.

3. Sliding device according to claim 1, wherein, that the support pipe on its free end is releasably conneceted with the extension pipe via a wedge or double wedge connection.

4. Sliding device according to claim 3, wherein, the support pipe on its free end is releasably secured to the extension pipe via set screws.

5. Sliding device according to claim 1, wherein the extension pipe is formed of two parts.

6. Sliding device according to claim 5, wherein the two-part extension pipe is comprised of a friction resistant inner pipe layer and a softer outer pipe layer.

7. Sliding device according to claim 6, wherein said inner pipe layer is formed of a material which had been subjected to a hardening treatment and said outer pipe layer is formed of a material which had not been subjected to said hardening treatment.

8. Sliding device according to claim 1, wherein the extension pipe has at least in the connection part to the pivot pipe, a larger inner diameter than the pivot pipe.

9. Sliding device according to claim 1, wherein the rotating mount is formed as a slide mount with replaceable mount segments.

10. Sliding device according to claim 1, wherein a support arm cantilevered on the conveyance conduit side is provided on the reversing lever of the reversing mechanism, upon which the support pipe is supportable.

11. Sliding device according to claim 10, wherein the support arm lies, with its at least one mounting shell carrying free end, against the support pipe.

12. Sliding device according to claim 10 wherein the support arm is releasably connected, at its at least one mounting shell carrying free end, with the support pipe.

13. Sliding device according to claim 1, wherein the support pipe at least in the vicinity of its pivot pipe side end exhibits at least one radial wall throughhole.

14. Sliding device according claim 13, wherein said radial wall throughhole is directed downward.

15. Sliding device for a pump with two conveyance cylinders operating in counter-stroke for conveyance of viscous materials, which materials are supplied to the pump from a material feeding bin having at least a front wall, a back wall, and a floor, said conveyance cylinders each having one opening in communication with said material feeding bin through said material feeding bin back wall, said sliding device including a C-shape curved pivot pipe, an extension pipe, and a discharge conduit, the pivot pipe having an upper end and a lower end, said lower end extending into the material feeding bin and said upper end being fixedly connected to the extension pipe, the extension pipe projecting over the back wall of the material feeding bin essentially parallel to the conveyance cylinders, having a first end and a second end, the first end fixedly connected to the pivot pipe, the second end connected to the discharge conduit via a pipe rotating connection, the pivot pipe connected for pivoting via a reversing mechanism in such a manner that the lower end of the pivot pipe is caused to connect alternatively outside the openings of the conveyance cylinders which are connected to the back wall of the material supply bin, and further including a support pipe which coaxially encompases the extension pipe, is fixedly connected at the upper end of the pivot pipe, and extends along at least one part of the extension pipe, the support pipe being stayed upon at least one rotating support spaced apart from the back wall of the material feeding bin and being releasably connected to the extension pipe, wherein the extension pipe is releasably connected, via a flange external to the material feeding bin, with the pivot pipe and a reversing lever of the reversing mechanism, and wherein the support pipe is rigidly connected with the flange.

* * * * *